Figure 1:
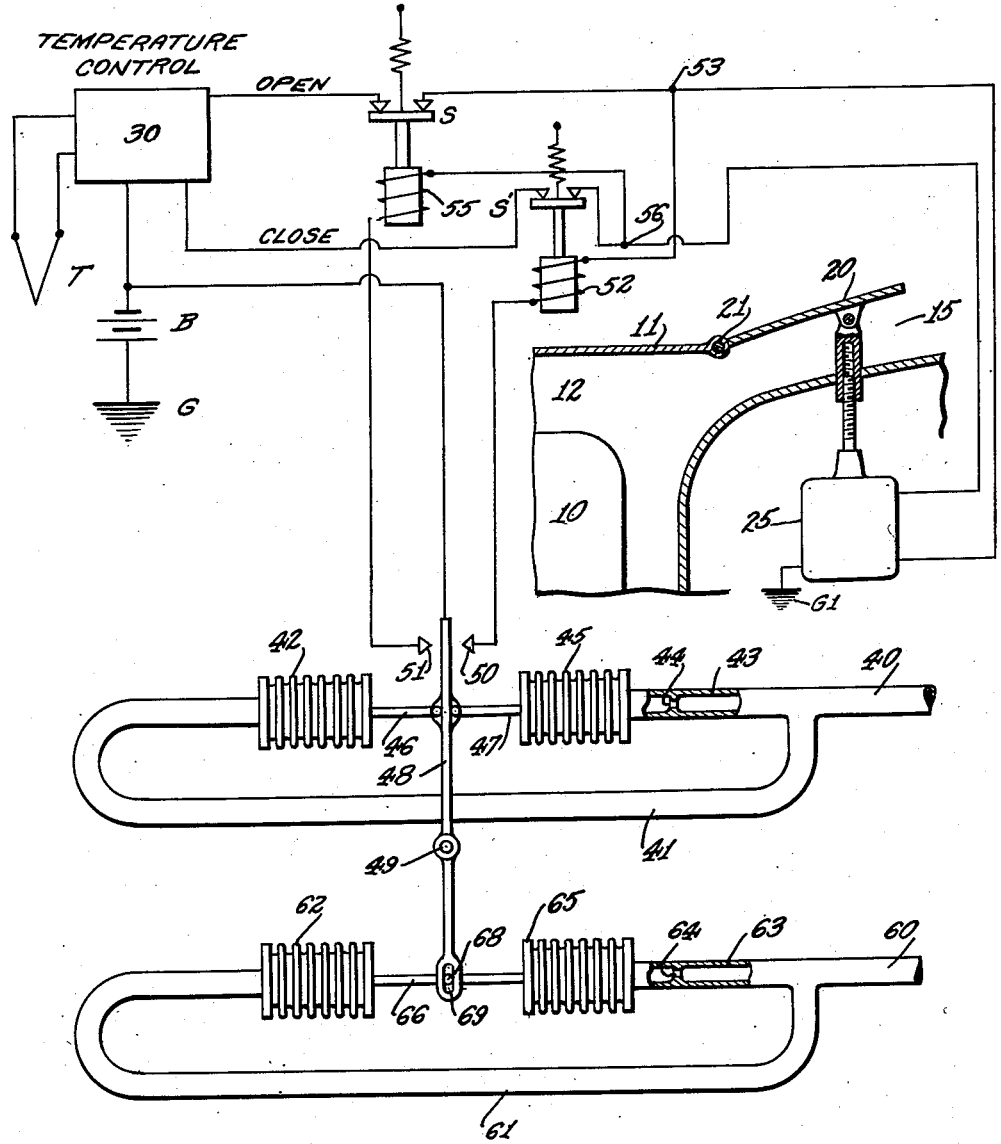

Dec. 5, 1950 R. N. WALLACE 2,533,156
CONTROL OF ENGINE CYLINDER TEMPERATURES
Filed Oct. 31, 1944 2 Sheets-Sheet 1

INVENTOR.
RUDOLF N. WALLACE
BY
John C. Kerr
ATTORNEY

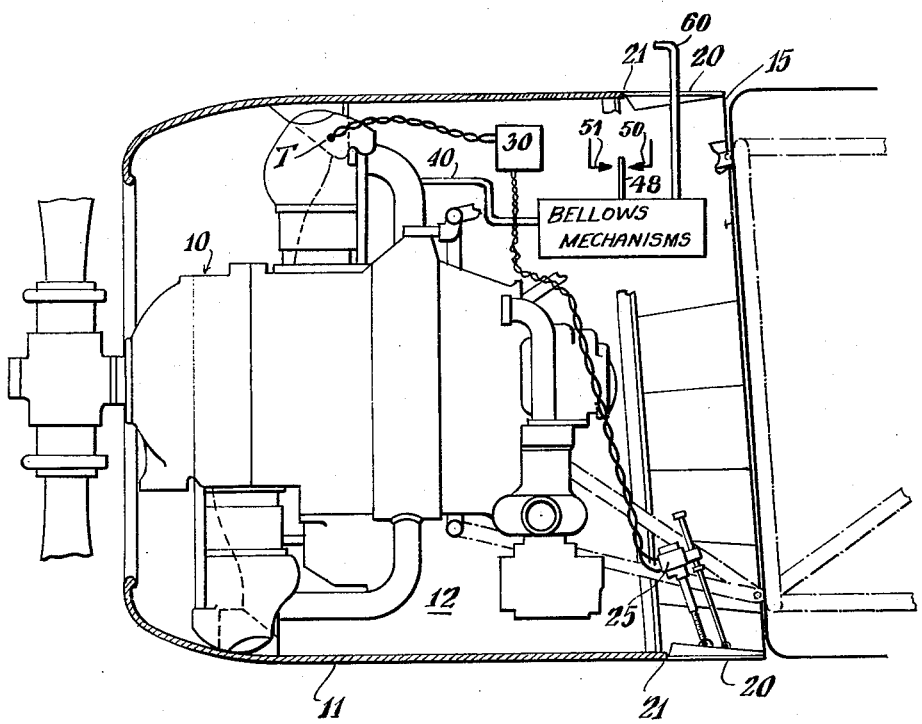

Patented Dec. 5, 1950

2,533,156

UNITED STATES PATENT OFFICE 2,533,156

CONTROL OF ENGINE CYLINDER TEMPERATURES

Rudolf N. Wallace, Glastonbury, Conn., assignor to United Aircraft Corporation, East Hartford, Conn., a corporation of Delaware Application October 31, 1944, Serial No. 561,293

6 Claims. (Cl. 123—41.05)

This invention relates to the automatic control of engine cylinder temperatures. While the invention has general application, it is described herein with special reference to the control of aircraft engine cylinder temperatures. More particularly, the invention relates to the automatic regulation of the quantity of cooling air flowing over the cylinders of an air-cooled engine. In most aircraft, cooling is effected by providing a cooling passage between the engine and the cowl enclosing it. The passage is provided with an air inlet and an air outlet so that cooling air is driven through the passage by the movement of the aircraft. The movement of the cooling air through the passage may be assisted by a fan. The regulation of the quantity of cooling air passing over the engine, and hence the degree of cooling, may be accomplished by means of flaps which vary the size of the inlet or outlet of the cooling passage, or by varying the fan speed, effective fan area or pitch of the fan blades, or by actuating both the flaps and the fan. Such control is effected by means responsive to the engine temperature and usually comprises a thermostatic element in contact with the cylinder. Other temperature-responsive elements such as liquid bulbs, resistance bulbs and chemical capsules have been employed.

The difficulty with the thermostatic or other temperature-responsive elements heretofore employed resides in the fact that all of these devices react to an increase in temperature of the cylinder surfaces and must absorb heat from these surfaces through an uncertain contact before their thermal response will initiate any corrective air flow control. This inherent lag in response may permit cylinder temperatures to exceed the allowable limits under circumstances of rapid changes in engine or airplane operating conditions. The basic fault lies in the fact that no corrective measures are called for by such control systems until after the cylinder temperatures have already varied to a substantial degree, in some cases in excess of the degree of variation to which the control is set. For these reasons it has been difficult to obtain safe regulation of engine cylinder temperatures by the use of the proposed temperature-responsive devices.

Control of engine cooling air flow from cylinder temperature is considered to be fundamentally correct for relatively slow, small, long-period changes in engine or aircraft operating conditions. It is not adequate for relatively large, rapid, short-period changes such as frequently occur in airplane operation. For the latter type of changes, all of which eventually have a marked effect on engine temperatures, it is desirable to anticipate the change in temperature in the engine cylinder, so that corrective measures can be initiated before the cylinder wall has acquired any substantial temperature variations. In this way, it is possible to prevent temperature from running away.

It is therefore a principal object of this invention to provide a combination of both types of cooling air flow control, (1) the standard type which is normally effective and which employs a temperature-responsive element in contact with the engine cylinder, and (2) a type which anticipates engine cylinder temperature change because of a change in engine or aircraft operating conditions.

It is a further object of this invention to provide a combination of controls as specified above wherein the standard or primary control is normally effective to control the cooling air flow and wherein the second or auxiliary control is adapted to become effective upon relatively large changes in engine or aircraft operating conditions. As soon as these changes cease or are reduced substantially in magnitude, the auxiliary control is automatically rendered ineffective.

It is a further object of this invention to provide a combination of controls, as specified above, in which the primary control is rendered ineffective to oppose the auxiliary control when the latter becomes effective.

Further objects and advantages of this invention will become apparent in the following detailed description thereof.

In the drawings:

Figure 1 is an assembly, largely diagrammatic, illustrating one embodiment of this invention; and Fig. 2 is a diagrammatic illustration showing the adaptation of the present invention to an aircraft engine assembly.

Referring to the drawings, it will be seen that the invention is described as applied to aircraft where the cooling fluid is air, but it will become apparent that the invention may be applied in equivalent ways as will be obvious from the present disclosure to those skilled in the art. The drawings indicate diagrammatically a portion of an aircraft engine 10 enclosed within a cowl 11 to form a cooling passage 12. This passage is open at its forward end to form an air inlet and is open at its rearward end to form an air outlet or exit passage 15. The movement of the craft will cause cooling air to move through passage 12 and cool the engine cylinders. Such movement of the cooling air through passage 12 may be facilitated by a fan. The amount of cooling air moving through passage 12 may be adjusted to the requirements of the engine cylinders by means such as flaps 20 pivoted at 21 so as to vary the degree of opening of either the outlet, as shown, or the inlet; or the adjustment may be made by controlling the speed, effective area or blade pitch of the fan; or both of these controls may be employed simultaneously. As shown in the drawing, the amount of cooling air is controlled by flaps 20 which may be adjusted by a reversible reduction motor 25 to vary the size of the outlet or exit passage and thus vary the amount of cooling air moving through passage 12. However, the invention applies equally to any of the other types of cooling air control.

The control of the quality of cooling air moving through passage 12 is normally effected by means responsive to the engine cylinder temperature. Thus, as shown, a thermostatic element T may be positioned in contact with the engine cylinder wall, usually at the rear spark plug, to detect variations in cylinder temperature. A rise in cylinder temperature will close a circuit in control box 30, said circuit extending from ground G, box 30, switch S, motor 25, to ground G'. This will energize motor 25 in such direction as to move flaps 20 to open outlet 15 further to permit more cooling air to flow through passage 12 in response to higher engine temperature, until the increased flow of cooling air reduces the engine temperature sufficiently to open the motor circuit. On the other hand, a drop in engine temperature will cause control box 30 to establish a circuit from ground G, box 30, switch S', motor 25 to ground G', to energize motor 25 in a direction to move flaps 20 in a direction to reduce outlet 15, to permit less cooling air to move through passage 12. This will continue until the decreased flow of cooling air permits the engine cylinder temperature to rise until the circuit through motor 25 is broken.

As stated in the introduction, the control described above is effective for slow, long-period, relatively small changes in engine cylinder temperatures. For large, rapid changes the response of the temperature-responsive element T is too slow and changes in the engine cylinder temperature to a substantial degree will have taken place before corrective measures are applied. This may lead to temperature "running away," i. e., getting out of control, because corrective measures are not anticipated or applied quickly enough. Therefore, I have provided in addition to the primary standard control described hereinbefore, an auxiliary control adapted to become effective to control motor 25 under conditions which would result in large changes in engine cylinder temperature. Moreover, I cause the auxiliary control to anticipate the changes in engine cylinder temperature so as to prevent running away of temperatures. Finally, I provide means for rendering the primary control ineffective to oppose the auxiliary control during the period that the auxiliary control is effective.

To accomplish the above results, my auxiliary control is based upon the premise that certain changes in aircraft operating conditions will eventually lead to engine cylinder temperature changes, and by causing the cooling air flow to be controlled in response to these changes in aircraft operating conditions, the variations in engine cylinder temperature can be anticipated. The two major operating conditions which will result in change in engine cylinder temperature are engine performance and aircraft speed. A change in engine performance can be detected by means responsive to variations in manifold pressure, while a change in aircraft speed can be detected by means responsive to the free stream dynamic pressure.

Referring to the drawing I have shown means responsive to variations in manifold pressure. This means may comprise a conduit 40 connected to the manifold, said conduit having a full-size branch conduit 41 connected to a bellows 42 and having a branch conduit 43 with a restriction 44 leading to bellows 45. The bellows are connected by links 46 and 47 to opposite sides of a lever 48 pivoted at 49. When there is a change in engine activity, the increase or decrease in manifold pressure will be transmitted in full to bellows 42 but not to bellows 45 (because of the restriction) and the balance will be upset, thus swinging lever 48 clockwise or counterclockwise. Thus, assuming an increase in engine activity, pressure in bellows 42 will rise faster than in bellows 45, lever 48 will rotate in a clockwise direction to cause it to make contact at 50 and close the following circuit: Ground G, battery B, lever 48, contact 50, coil 52, contact 53, motor 25 and ground G'. This energizes the motor in a direction to increase the size of outlet 15 and thus permits more cooling air to flow in anticipation of the higher temperatures caused by the increased engine activity. At the same time the energization of coil 52 opens switch S' and prevents the motor from being operated by the standard control in a direction to close the outlet.

Similarly, decreased activity of the engine, with reduction of manifold pressure, causes lever 48 to rotate in a counterclockwise direction to close the following circuit: Ground G, battery B, lever 48, contact 51, coil 55, contact 56, motor 25, ground G'. This energizes the motor in a direction to close the flaps in accordance with the decreased cooling air requirements of the engine cylinder. At the same time, energization of coil 55 opens switch S and prevents the primary control from opening the flaps.

In either of the above cases, as soon as the manifold pressures in the bellows 42 and 45 again become balanced, lever 48 breaks contact at 50 and 51, and the primary control is again effective as the sole control.

A similar arrangement is provided whereby the auxiliary control becomes effective upon changes in aircraft speed. In this case, a conduit 60 transmits the free stream dynamic pressure to bellows 62 by way of full-sized conduit 61 and transmits pressure to bellows 65 by way of conduit 63 having restriction 64. The bellows 62 and 65 are connected to opposite sides of lever 48 by link 66 and pin-and-slot connection 68, 69. It will be noted that bellows 62 and 65 act upon lever 48 on the opposite side of pivot 49 from bellows 42 and 45. This is due to the fact that an increase in manifold pressure requires more cooling air for the engine cylinders, whereas an increase in free stream dynamic pressure calls for a reduction in the amount of cooling air. Manifold pressures and free air stream pressures thus act oppositely.

From the above description it will be seen that the auxiliary control is selectively rendered effective by manifold pressure changes and by free stream dynamic pressure changes, and that the movement of lever 48 is the result of the algebraic addition of these forces. However, either one of these may be used separately as an auxiliary control without the presence of the other.

In Fig. 2 there is illustrated diagrammatically the application of the control system of the present invention to a conventional aircraft engine. In this figure a portion of the conventional showing, taken without substantial change from a prior art patent, has been varied by breaking out a portion of the showing of the prior art and inserting in this place a diagrammatic representation of certain of the mechanisms shown in detail in Fig. 1. As shown, for example, in Fig. 2, the words "Bellows Mechanisms" in a box is intended to include the parts designated by reference numbers 40 through 69 of Fig. 1. In Fig. 2 the upper portion of the arm 48 and its contacts 50 and 51 are shown, as are also the connections 40 and 60 to the intake manifold and to a point in the air stream respectively. No attempt is made in this figure to show the entire wiring diagram which is clearly illustrated in Fig. 1.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other equivalent means. Also, while it is designed to use the various features and elements in the combination and relations described, some of these may be altered and others omitted without interfering with the more general results outlined, and the invention extends to such use.

What is claimed is:

1. In an aircraft having an air-cooled engine and having means for controlling the flow of cooling air past said engine and thereby controlling the temperature thereof, and a reversible motor for actuating said air flow controlling means, in combination, means directly responsive to the temperature of said engine for normally controlling the operation of said motor in a corrective direction and in a manner solely responsive to the engine temperature, means for containing a fluid pressure, the value of which pressure is characteristic of a condition which affects engine temperature, a secondary anticipatory control system connected to control the operation of said motor in a corrective direction, including means independent of the engine temperature and of any absolute value of said fluid pressure, but responsive solely to a change in such value, for initiating the operation of said anticipatory control system to cause the actuation of said motor in a direction respectively to correct for an anticipated change in the cooling requirements of said engine, and means included in said secondary control system and effective upon the initiation of the operation thereof for preventing actuation of said motor in a respectively reverse direction by said engine temperature responsive means solely during the time said secondary control system is causing the actuation of said motor in a direction to compensate for an anticipated change in the cooling requirements of said engine.

2. Temperature control means for an aircraft engine in accordance with claim 1, wherein said engine has an intake manifold, and wherein said fluid pressure is the fluid pressure in said manifold.

3. Temperature control means for an aircraft engine in accordance with claim 1, wherein said pressure is the pressure of the cooling air flowing past said engine, the flow of which is controlled by said air flow controlling means.

4. In an aircraft having an air-cooled engine provided with an intake manifold and having means for controlling the flow of cooling air past said engine and thereby controlling the temperature thereof, and a reversible motor for actuating said air flow controlling means, in combination, means directly responsive to the temperature of said engine for normally controlling the operation of said motor in a corrective direction and in a manner solely responsive to the engine temperature, a secondary anticipatory control system connected to control the operation of said motor in a corrective direction, including a first means independent of the engine temperature and of any absolute value of the pressure in said intake manifold, but solely responsive to a change in such value, a second means also independent of engine temperature and of any absolute value of the pressure of said flow of cooling air, but solely responsive to a change in the pressure of said cooling air, a movable means positioned in accordance with a balance between said first means and said second means, means responsive to movement of said movable means to its extreme positions for initiating the operation of said anticipatory control system to cause the actuation of said motor in a direction respectively to correct for an anticipated change in the cooling requirements of said engine, and means included in said secondary control system and effective upon the initiation of the operation thereof for preventing actuation of said motor in a respectively reverse direction by said engine temperature responsive means solely during the time said secondary control system is causing the actuation of said motor in a direction to compensate for an anticipated change in the cooling requirements of said engine.

5. Aircraft engine temperature controlling means in accordance with claim 1, wherein said means responsive to a change in the value of said fluid pressure comprises a pair of opposed bellows to both of which said fluid pressure is conducted, a bleed passage interposed in the path of pressure to one of said bellows, a movable element jointly controlled by said bellows, whereby the position of said movable element is independent of absolute pressures within said bellows but responsive to changes in such pressures, and means responsive to the position of said movable element for controlling the operation of said motor in a direction to correct for an anticipated change in the cooling requirements of said engine.

6. Aircraft engine temperature controlling means in accordance with claim 4, wherein said secondary anticipatory control system comprises two pairs of opposed bellows, means conducting manifold pressure to both bellows of one of said pairs, means for conducting free air stream pressure to both bellows of the other of said pairs, bleed passages interposed in the path of pressure to one bellows of each of said pairs, a movable element connected to both pairs of opposed bellows in such manner that the position of said movable element is independent of the absolute values of said manifold pressure and of said free air stream pressure but is responsive to a resultant of the changes in such pressures, and means responsive to the position of said movable element for controlling the operation of said motor in a direction to correct for an anticipated change in the cooling requirements of said engine during the interruption in the normal control by said temperature responsive means.

RUDOLF N. WALLACE.

REFERENCES CITED

The following references are of record in the file of this patent:

UNITED STATES PATENTS

| Number | Name | Date |
| --- | --- | --- |
| 2,081,762 | Nissen | May 25, 1937 |
| 2,384,088 | Hagen | Sept. 4, 1945 |